US009489971B1

(12) United States Patent
Klarqvist et al.

(10) Patent No.: US 9,489,971 B1
(45) Date of Patent: Nov. 8, 2016

(54) FLEXIBLE CIRCUIT FOR CONCURRENTLY ACTIVE RECORDING HEADS

(71) Applicant: Seagate Technology LLC, Cupertino, CA (US)

(72) Inventors: Karsten Klarqvist, Roseville, MN (US); Andrew R. Motzko, Delano, MN (US); Rick P. Freeman, Northfield, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/608,730

(22) Filed: Jan. 29, 2015

(51) Int. Cl.
G11B 5/48 (2006.01)

(52) U.S. Cl.
CPC ................. *G11B 5/4846* (2013.01)

(58) Field of Classification Search
CPC  G11B 33/122; G11B 5/4853; H05K 1/0393; H05K 1/189; H05K 2201/2009
USPC ................ 360/245.8, 245.9, 264.2
See application file for complete search history.

(56) References Cited

U.S. PATENT DOCUMENTS

| | | | | |
|---|---|---|---|---|
| 5,095,396 A * | 3/1992 | Putnam | ................ | G11B 5/5521 360/245.8 |
| 5,161,074 A * | 11/1992 | Forbord | ................ | G11B 5/486 360/264.2 |
| 5,499,161 A * | 3/1996 | Hosseinzadeh | ........ | H05K 1/189 360/98.01 |
| 5,539,595 A * | 7/1996 | Beck | ................ | G11B 19/2009 360/97.13 |
| 5,541,788 A * | 7/1996 | Ishida | ................ | G11B 5/5521 360/98.01 |
| 5,583,720 A * | 12/1996 | Ishida | ................ | G11B 5/4813 360/264.2 |
| 5,631,788 A * | 5/1997 | Richards | ............. | G11B 5/4846 360/245.9 |
| 7,457,896 B1 * | 11/2008 | Mount | ............ | G11B 20/10046 360/55 |
| 7,633,543 B2 * | 12/2009 | Shinomiya | ........ | H01L 27/14618 348/340 |
| 8,111,485 B2 * | 2/2012 | Freeman | ............ | G11B 5/4806 360/264.1 |
| 8,134,807 B2 | 3/2012 | Escobar-Bowser et al. | | |
| 8,144,432 B2 | 3/2012 | Freeman et al. | | |
| 8,238,061 B2 | 8/2012 | Razak | | |
| 8,385,023 B2 | 2/2013 | Abdul Razak | | |
| 8,589,964 B2 * | 11/2013 | Ochi | ........................ | G11B 7/12 720/658 |
| 2011/0247862 A1 | 10/2011 | Low | | |
| 2012/0063025 A1 * | 3/2012 | Wilson | ..................... | G11B 5/09 360/59 |
| 2013/0286800 A1 | 10/2013 | Ver Meer et al. | | |
| 2013/0286801 A1 | 10/2013 | Shivarama et al. | | |
| 2014/0177083 A1 | 6/2014 | Heim et al. | | |

FOREIGN PATENT DOCUMENTS

| | | | | | |
|---|---|---|---|---|---|
| JP | 06069279 A | * | 3/1994 | | |
| JP | 07009785 A | * | 1/1995 | | |
| JP | 4374251 B2 | * | 12/2009 | ............ | H01L 25/105 |
| WO | WO 03010816 A1 | * | 2/2003 | ......... | H01L 23/5387 |

* cited by examiner

*Primary Examiner* — Will J Klimowicz
(74) *Attorney, Agent, or Firm* — Hollingsworth Davis, LLC

(57) ABSTRACT

A system includes a first preamplifier, a second preamplifier and a flex circuit. The first preamplifier is configured to be connected to a first plurality of recording heads. The second preamplifier is configured to be connected to a second plurality of recording heads. At least one of the first plurality of recording heads and at least one of the second plurality of recording heads are configured to concurrently perform read and or write operations. The flex circuit is a single flex circuit configured to connect the first and second preamplifiers to the plurality of recording heads.

20 Claims, 11 Drawing Sheets

FLEXIBLE CIRCUIT FOR CONCURRENTLY ACTIVE RECORDING HEADS

SUMMARY

A system of the present disclosure includes a first preamplifier, a second preamplifier and a flex circuit. The first preamplifier is configured to be connected to a first plurality of recording heads. The second preamplifier is configured to be connected to a second plurality of recording heads. At least one of the first plurality of recording heads and at least one of the second plurality of recording heads are configured to concurrently perform read and or write operations. The flex circuit is a single flex circuit configured to connect the first and second preamplifiers to the plurality of recording heads.

An apparatus of the present disclosure comprises a single flex circuit having first and second preamplifiers. The single flex circuit is configured to have an unfolded configuration placing the first and second preamplifiers in a first position relative to one another and a folded configuration placing the first and second preamplifiers in a second position relative to one another; the second position is different from the first.

An apparatus of the present disclosure comprises a single flex circuit having a plurality of preamplifiers and a plurality of bond pad sets per each of the plurality of amplifiers. Each of the plurality of amplifiers is configured to be electrically coupled to their respective bond pad sets and each of the plurality of bond pad sets is configured to interface with a respective recording head.

The above summary is not intended to describe each embodiment or every implementation. A complete understanding will become apparent and appreciated by referring to the following detailed description and claims in conjunction with the accompanying drawings.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Systems, devices or methods disclosed herein may include one or more of the features structures, methods, or combination thereof described herein. For example, a device or method may be implemented to include one or more of the features and/or processes below. It is intended that such device or method need not include all of the features and/or processes described herein, but may be implemented to include selected features and/or processes that provide useful structures and/or functionality.

Hard disk drives (HDDs) are digital data storage devices which may allow host computers to store and retrieve large amounts of data in a fast and efficient manner. A typical disk drive may include a plurality of magnetic recording disks which are mounted to a rotatable hub of a spindle motor and rotated at a high speed. Information may be stored on each disk in concentric tracks. The data tracks are usually divided into sectors. Information may be written to and/or read from a storage surface(s) of a disk by a transducer or recording head. The transducer may include a read element separate from a write element, or the read and write elements may be integrated into a single read and write element. The transducer may be mounted on an actuator arm capable of moving the transducer in an arcuate, radial motion over the disk. Accordingly, the movement of the actuator arm may allow the transducer to access different data tracks. The disk is rotated by the spindle motor at high speed, which may allow the transducer to access different sectors within each track on the disk.

Figure 1:
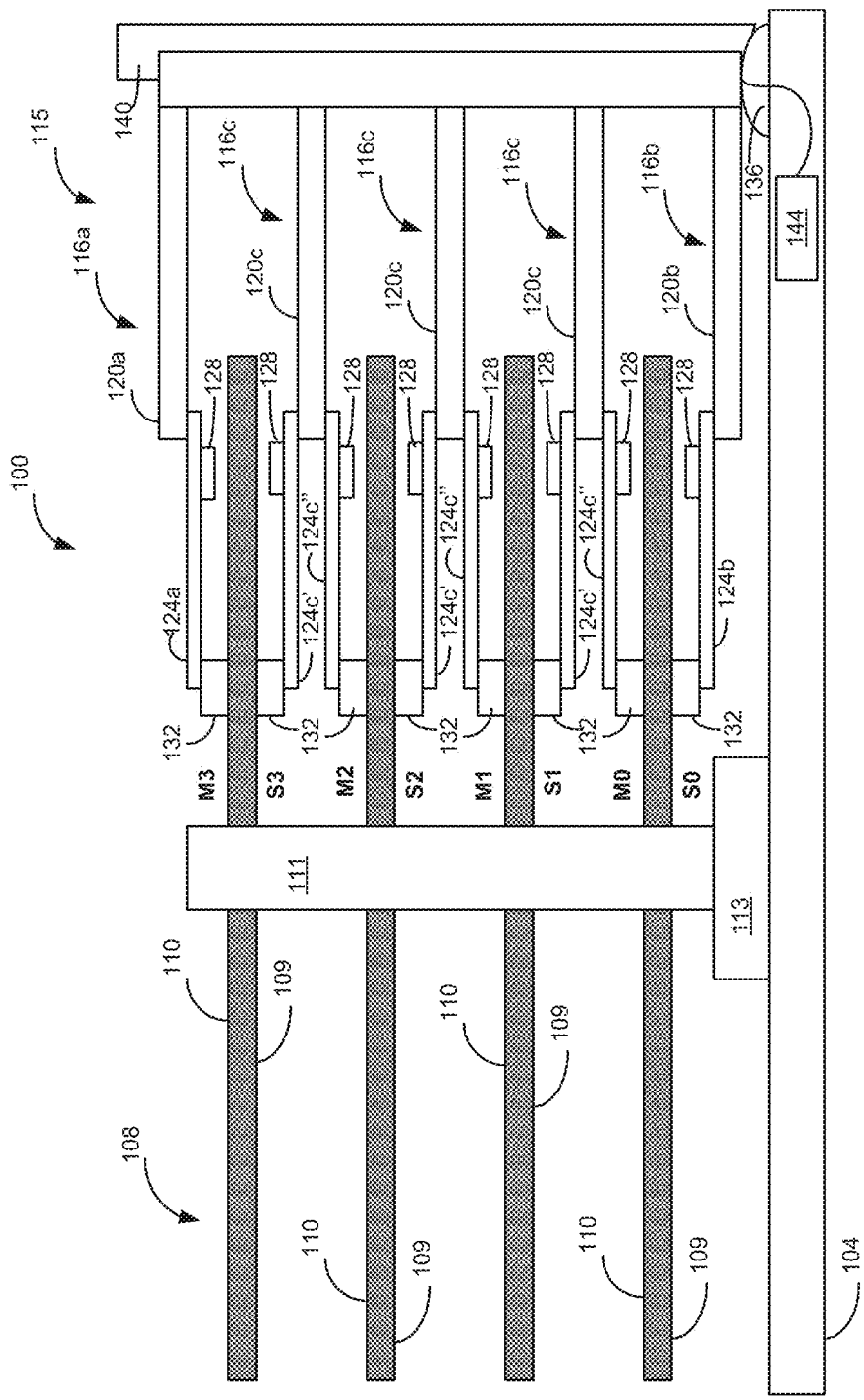
FIG. 1 is a cross-section view of an example, parallel actuation, multiple head HDD that may incorporate the flex circuit embodiments of the present disclosure.
Figure 2:
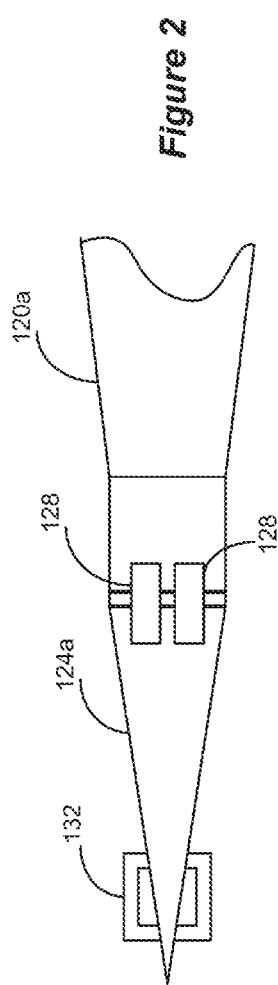
FIG. 2 is an exploded view of portions of the HDD of FIG. 1.

The speed at which the data transfer occurs has become increasingly important with the encroachment of solid state drives (SSDs) into storage solutions currently served by HDDs. A response to this encroachment is an HDD incorporating concurrent operation of multiple heads. An example configuration of such an HDD is illustrated in FIG. 1. As shown. HDD 100 includes a base 104 and a plurality of parallel data storage disks 108, for example magnetic storage disks, having data storage tracks defined on both a lower surface 109 and an upper surface 110. The data storage disks 108 are positioned about a spindle 111 and are interconnected to the base 104 by a spindle motor 113 mounted within or beneath a hub (not shown), such that the disks 108 can be rotated relative to the base 104.

HDD 100 is provided with a head stack assembly 115, coupled to a controller 144, which includes a top actuator arm assembly 116a, a bottom actuator arm assembly 116b, and a plurality of intermediate actuator arm assemblies 116c. Each of top and bottom actuator arm assemblies 116a, 116b, includes, respectively, a first member 120a, 120b and a second member 124a, 124b. Each of intermediate arm assemblies 116c include a first member 120c and two second members 124c' and 124c". The first members 120a, 120b and 120c are coupled between base 104 and their respective second members 124a, 124b, 124c' and 124c", and the members 120a, 120b, 120c and 124a, 124b, 124c', 124c" can provide two stages of movement. Interconnecting the respective first members 120a, 120b, 120c and the second members 124a, 124b, 124c', 124c" is a micro actuator 128. A transducer (or recording head) 132 is mounted on a distal portion of each of the second members 124a, 124b, 124c', 124c" so that it can be positioned adjacent to a storage surface of the disk 108. The transducer 132 may, for example, comprise a magneto resistive (MR) element and/or a thin film inductive write element.

In the HDD 100 of FIG. 1, each of the second members 124a, 124b, 124c', 124c" along with their associated micro actuators 128 and transducers 132 may be deemed a master head configuration, designated with M0, M1, M2, and M3 or a slave head configuration, designated with S0, S1, S2, and S3. In this arrangement, each of the master head configurations includes micro actuator 128 to position in the x-y plane its associated transducer 132 adjacent the lower surface 109 of data storage disk 108 and each of the slave head configurations includes a paired micro actuator 128 to position in the x-y plane its associated transducer 132 adjacent the upper surface 110 of the same data storage disk 108. Further, in this arrangement, for every master head configuration there is a paired slave head configuration associated therewith. However, it is possible for a master or slave head configuration to exist without an associated counterpart.

Figure 3:
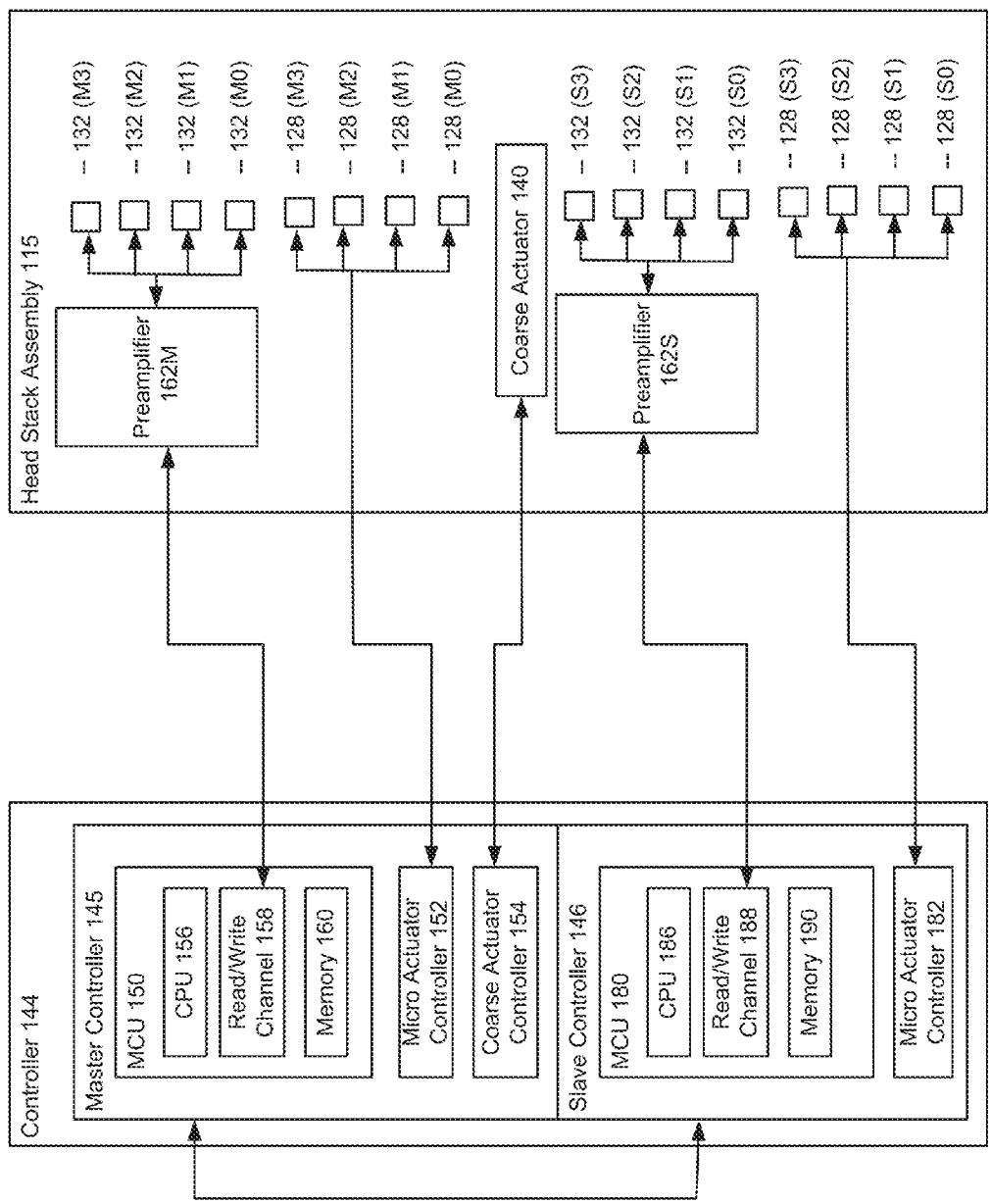
FIG. 3 is a block diagram illustrating the relationship between the controller and head stack assembly of the HDD of FIG. 1.

The block diagram of FIG. 3 provides a simplified illustration of the relationship between the electronics of the controller 144 and the elements of the head stack assembly 115 according to the HDD 100 of FIG. 1. The electronics, provided via printed circuit board or other appropriate means, present the controller 144 as a master controller 145 and a slave controller 146. The master controller 145 and the slave controller 146 may, for example, comprise two individual controllers, or alternatively, a single controller partitioned to operate as two controllers, or alternatively, a single controller whose logic has been programmed to work in a master/slave mode. Regardless of the controller configuration, communication occurs between the master controller 145 and the slave controller 146 through appropriate communication protocols.

The master controller 145 provides for a microcontroller unit (MCU) 150, a micro actuator controller 152, e.g., PZT controller, and a coarse actuator controller 154, e.g., voice coil motor controller. The MCU 150 generally includes a central processing unit (CPU) 156, a read and write channel 158, and memory 160 (e.g., cache memory, flash memory, memory for firmware, etc.). The slave controller 146 provides for an MCU 180 and a micro actuator controller 182, PZT controller. The MCU 180 generally includes a CPU 186, a read and write channel 188, and memory 190 (e.g., cache memory, flash memory, memory for firmware, etc.). The controller 154, master controller 145 and/or slave controller 146 may include other associated components and/or circuitry, digital or analog, as necessary to a specific application.

The master controller 145 sends control signals to a first preamplifier 162M, located within the head stack assembly 115, and the first preamplifier 162M selects which one of the plurality of master transducers 132 (M0-M3) to supply with current to enable a read or write operation. The master controller 145 additionally sends signals from the micro actuator controller 152 to the relevant master micro actuator 128 (M0-M3) and from the coarse actuator controller 154 to the coarse actuator 140 to position the selected transducer 132 (M0-M3) at a desired location relative the respective lower surface 109 of the data storage disk 108.

Simultaneously, the slave controller 146 receives instructions from the master controller 145 to select the slave transducer 132 (S0-S3) that is paired with the master transducer 132 (M0-M3). The slave controller 146 sends control signals to a second preamplifier 162S, located within the head stack assembly 115, and the second preamplifier 162S accordingly selects which one of the plurality of slave transducers 132 (S0-S3) to supply with current to enable a read or write operation. The slave controller 146 additionally sends signals from the micro actuator controller 182 to the relevant, paired slave micro actuator 128 (S0-S3). The movement of the coarse actuator 140, provided by master controller, in combination with movement of the paired slave micro actuator 128 (S0-S3) positions the slave transducer 132 (S0-S3) at a desired location relative the respective upper surface 110 of the data storage disk 108.

In an example operation, master controller 145 has received an instruction from a host (not shown) to perform a read operation using master transducer 132 (M2). In response a signal is sent from the MCU 150 to first preamplifier 162M to provide current to transducer 132 (M2) to enable a read. Additional signals are sent from master controller 145 to micro actuator controller 152 to position master micro actuator 128 (M2). Simultaneously, a signal is sent from the master controller 145 to the slave controller 146 to send a signal to the second preamplifier 162S to provide current to the corresponding, paired slave transducer 132 (S2) to enable a read operation as well as to send a signal to micro actuator controller 182 to position slave micro actuator 128 (S2). As a result, the coarse actuator controller 154 actuates the arm assemblies, more specifically, intermediate arm assembly 116c, while micro actuator controller 154 actuates master micro actuator 128 (M2) to move second member 124c' and master transducer 132 (M2) in the x-y plane and adjacent the lower surface 109 of data storage disk 108 and micro actuator controller 182 actuates slave micro actuator 128 (S2) to move second member 124c″ and slave transducer 132 (S2) in the x-y plane and adjacent the upper surface 110 of data storage disk 108. Thereafter, concurrent reads are performed by master transducer 132 (M2) and slave transducer 132 (S2) and the read data returned to the respective read and write channels, 158, 188 of the respective controllers 145, 146, e.g., concurrent servo demodulation is performed on two heads.

Figure 4B:
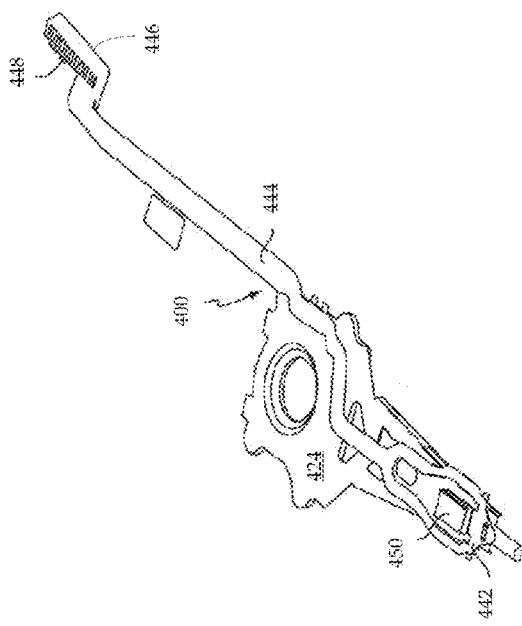
FIGS. 4A and 4B illustrate an example flexible circuit in relation to an actuator assembly in a disk drive.
Figure 4A:
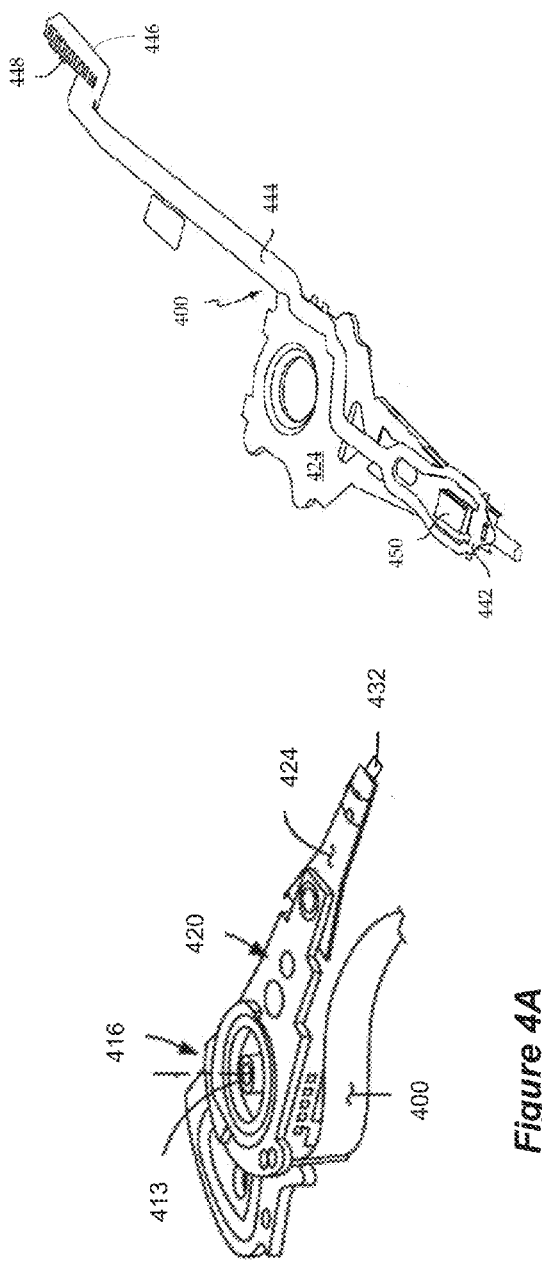

In the above-described HDD 100 configuration, a flex circuit secured at the head stack assembly 115 incorporates both preamplifiers 162M, 162S and provides the connection of controller to preamplifier to transducer enabling master and slave transducers to be driven independently and concurrently on a set of paired tracks. FIG. 4A illustrates a simplified, example configuration of a flex circuit 400 proximate a single actuator arm assembly 416, about a central hub 413, with first member 420, second member 424, and transducer 432 identified. Further detail of the flex circuit 400 is provided in FIG. 4B. As shown, flex circuit 400 includes an interconnect portion 442, a central portion 444, and a tail portion 446. The interconnect portion 442 interfaces with the transducer 432 and other electrical elements of the slider 450. A plurality of traces extend from the interconnect portion 442 along the central portion 444 to contacts 448 at the tail portion 446; the contacts 448 are electrically coupled to the drive circuitry (not shown).

To accommodate the dual amplifier configuration described herein particular consideration is given to signal path layout to ensure that signal integrity for all head channels is maintained. The disclosure, and related figures, below illustrates various example embodiments of flexible (hereafter "flex") circuits and signal paths appropriate for inclusion in the HDD of FIG. 1.

Figure 5:
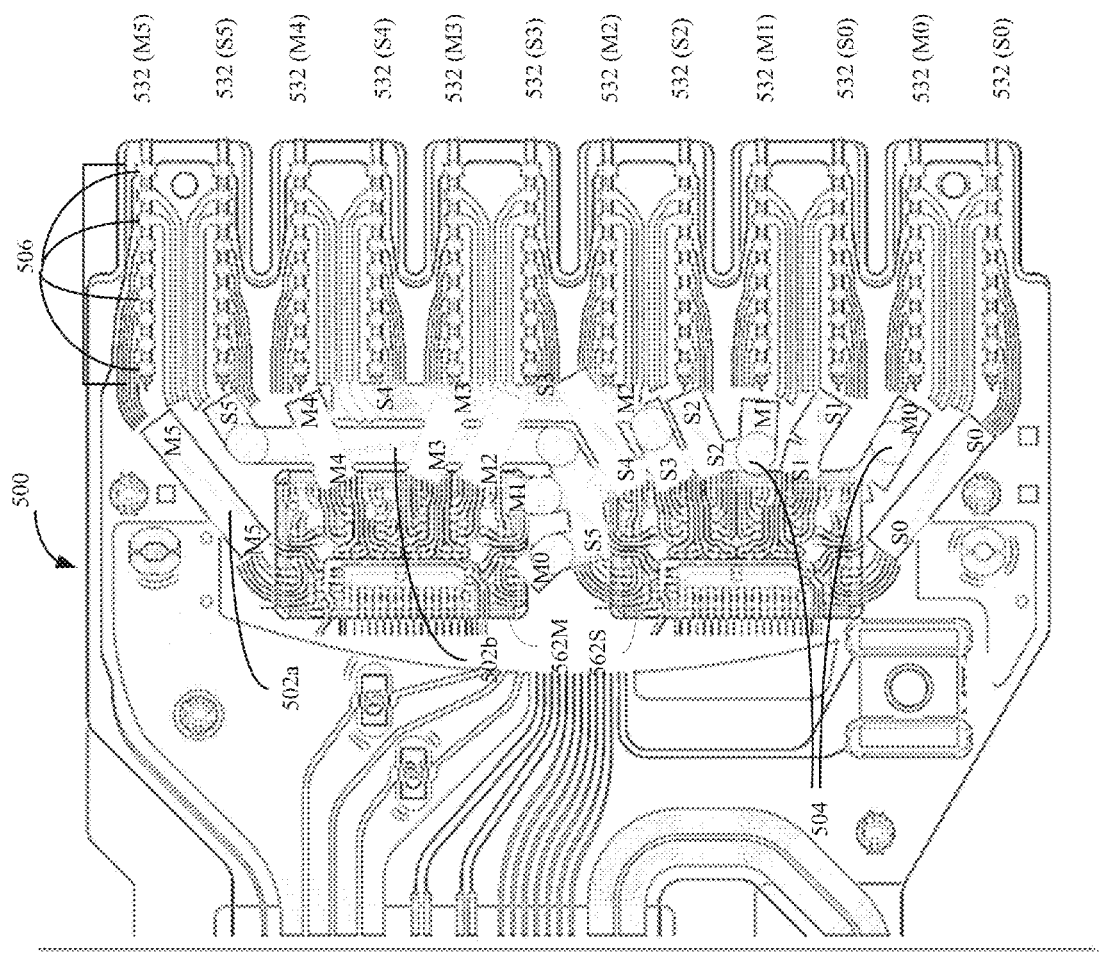
FIGS. 5-12 are flexible circuit configurations in accordance with various embodiments.

The flex circuits of the present disclosure may be categorized as non-folded and folded flex circuit designs. An example embodiment of a non-folded flex circuit 500 is illustrated in FIG. 5. The non-folded flex circuit 400 utilizes two or more conducting layers 502a and 502b in combination with vias 504 to connect master preamplifier 562M and slave preamplifier 562S to their respectively paired heads 532 (M0-M5) and 532 (S0-S5) (actual heads not shown); the start and end of each path is noted in the figure. FIG. 5 also illustrates the series of bond pads 506 for connecting the circuitry of the flex circuit 500 with the head gimbal assemblies for each head. In this example, nine bond pads 506 are provided and typically include pads for a reader (R+, R−), a writer (W+, W−), micro-actuator motors (uA), a dual-ended temperature coefficient of resistance sensor (DE-TCR+, DETCR−), and two heaters (Heater1, Heater2). Other bond pad configurations may be used as appropriate for the application.

Figure 6:
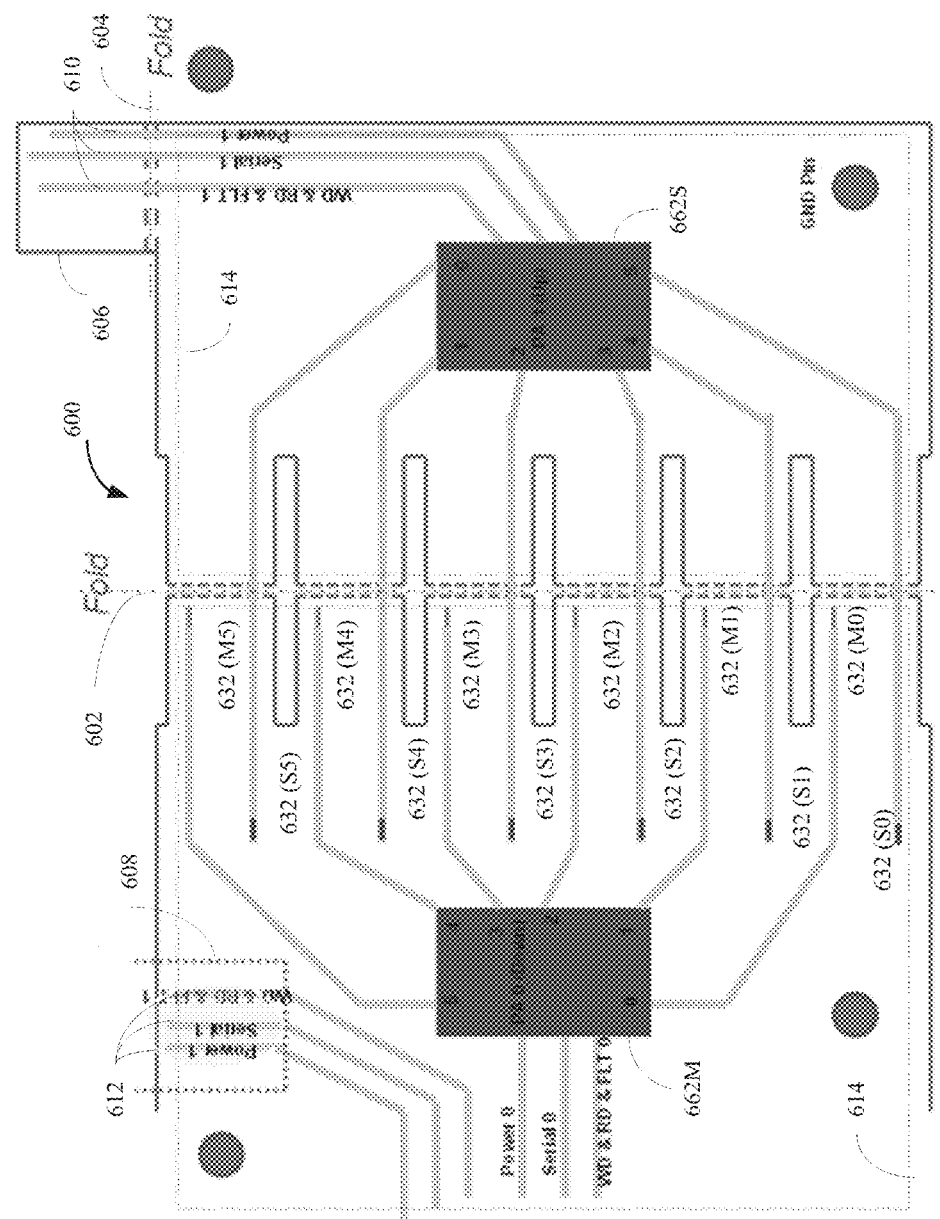

In a folded flex circuit configuration it is possible to route every head channel toward the head gimbal assembly side then fold the flex circuit over and behind to a second amplifier freeing up space on the front of the flex circuit to design in signal integrity. The folded flex circuit configuration may provide options where no traces need to be jumpered and the flexible circuit assemblies may be manufactured with a single conductor layer at reduced cost. An example embodiment of a folded flex circuit 600 is illustrated in FIG. 6. The flex circuit 600 includes the master preamplifier 662M configured to be coupled to master heads 632 (M0-M5) (actual heads not shown) and the slave preamplifier 662S configured to be coupled to slave heads 632 (S0-S5) (actual heads not shown). A centrally positioned fold 602 enables the slave preamplifier 662S to be folded behind the master preamplifier 662M. The flex circuit 600 is additionally provided with a second fold 604 whereby, once the first fold has occurred, a tab 606 may be folded at fold 602 placing it in location 608, which is indicated by a dotted line. With the tab 606 positioned at location 608 the traces 610 of the tab 606 may be interconnected to the traces 612. The interconnection may be achieved by solder, electrically conductive adhesive, ultrasonic bonds, or the like. A stiffener 614, for example, aluminum, may be provided to either side of the fold 602 enabling amplifier heat sink, and easier fold and assembly, processes.

Figure 7:
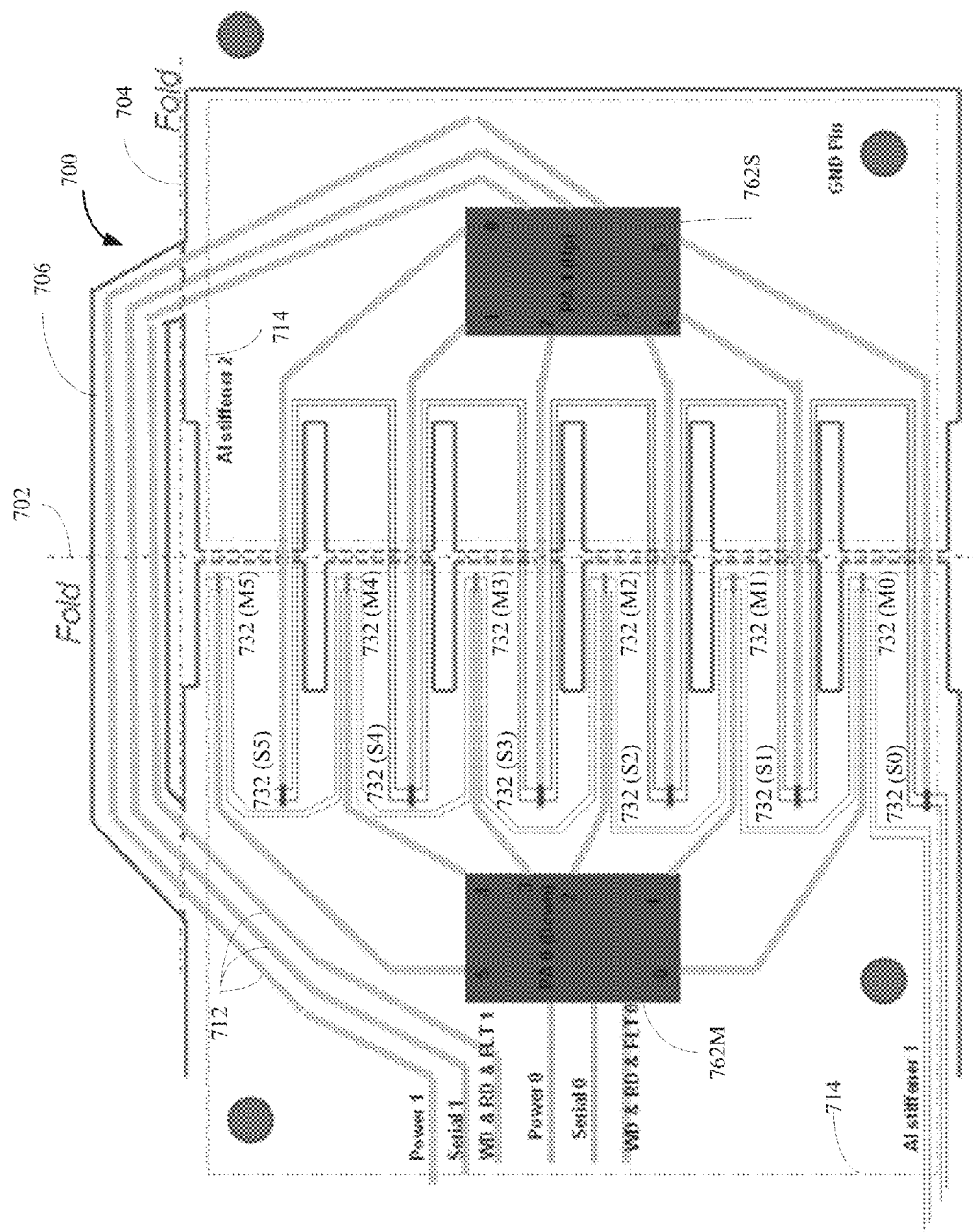

Another example embodiment of a folded flex circuit 700 is illustrated in FIG. 7. The flex circuit 700 includes the master preamplifier 762M configured to be coupled to master heads 732 (M0-M5) (actual heads not shown) and the slave preamplifier 762S configured to be coupled to slave heads 732 (S0-S5) (actual heads not shown). A centrally positioned fold 702 enables the slave preamplifier 762S to be folded behind the master preamplifier 762M. The flex circuit 700 is additionally provided with a second fold 704 enabling an elongated tab 706 to be folded in between the front (master) and back (slave) folded flex surfaces. 708 and 710 respectively. The elongated tab 706 enables the traces 712 to be continuously maintained from the front folded flex surface 708 to the back folded flex surface 710. The elongated tab 706 eliminates the need for the interconnect between 610 and 612 in the embodiment illustrated in FIG. 6. A stiffener 714, for example, aluminum, may be provided to either side of the fold 702 enabling amplifier heat sink and easier fold and assembly, processes.

Figure 8:
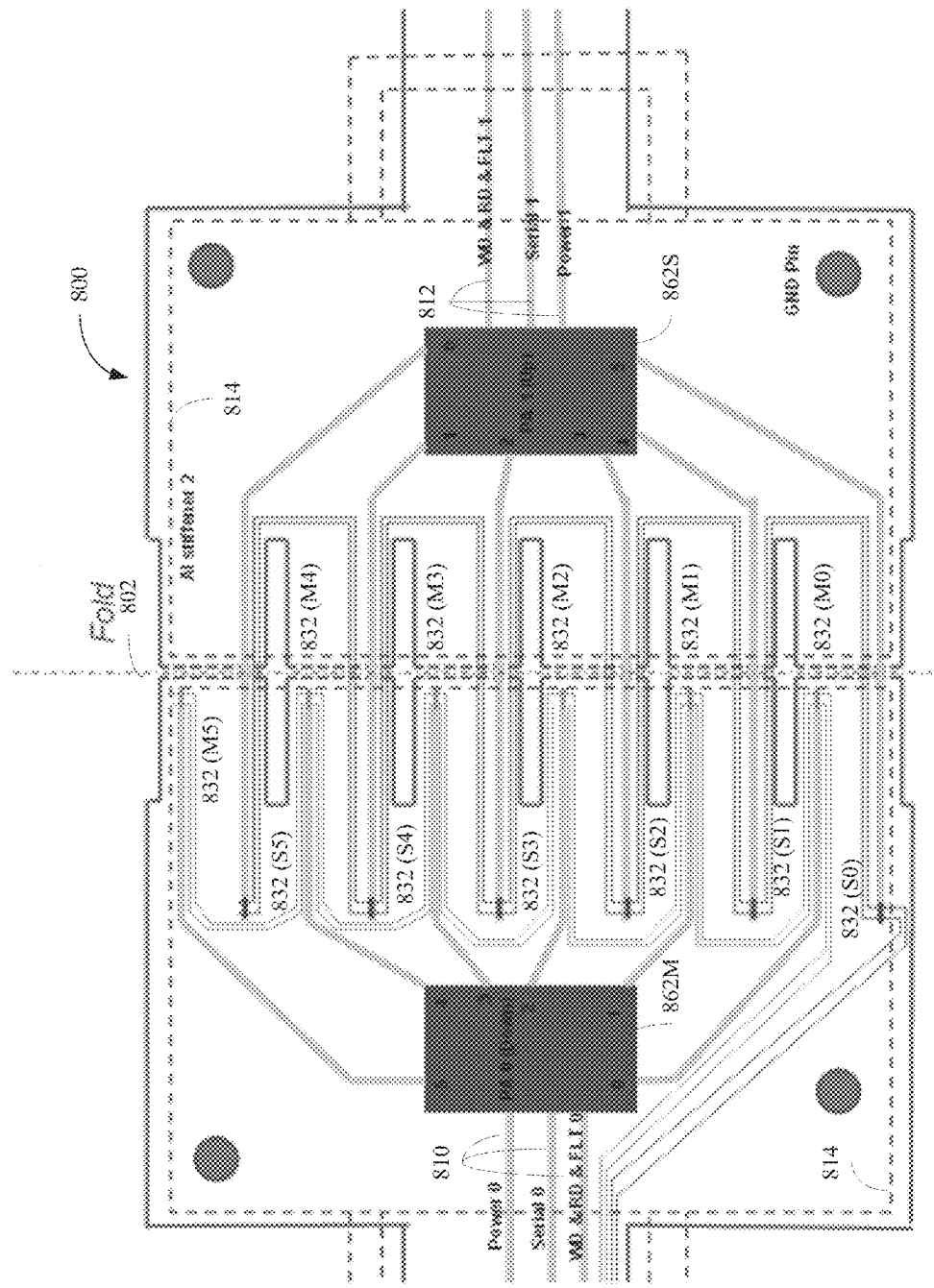

Another example embodiment of a folded flex circuit 800 is illustrated in FIG. 8. The flex circuit 800 includes the master preamplifier 862M configured to be coupled to master heads 832 (M0-M5) (actual heads not shown) and the slave preamplifier 862S configured to be coupled to slave heads 832 (S0-S5) (actual heads not shown). A centrally positioned fold 802 enables the slave preamplifier 862S to be folded behind the master preamplifier 862M. This configuration presents a dynamically doubled loop with traces 810 and 812 separately provided to their respective preamplifiers. Further, this configuration is of minimal height which may be beneficial to height constrained applications, for example, notebook computers. Once again, a stiffener 814, for example, aluminum, may be provided to either side of the fold 802 enabling amplifier heat sink, and easier fold and assembly processes.

Figure 9:
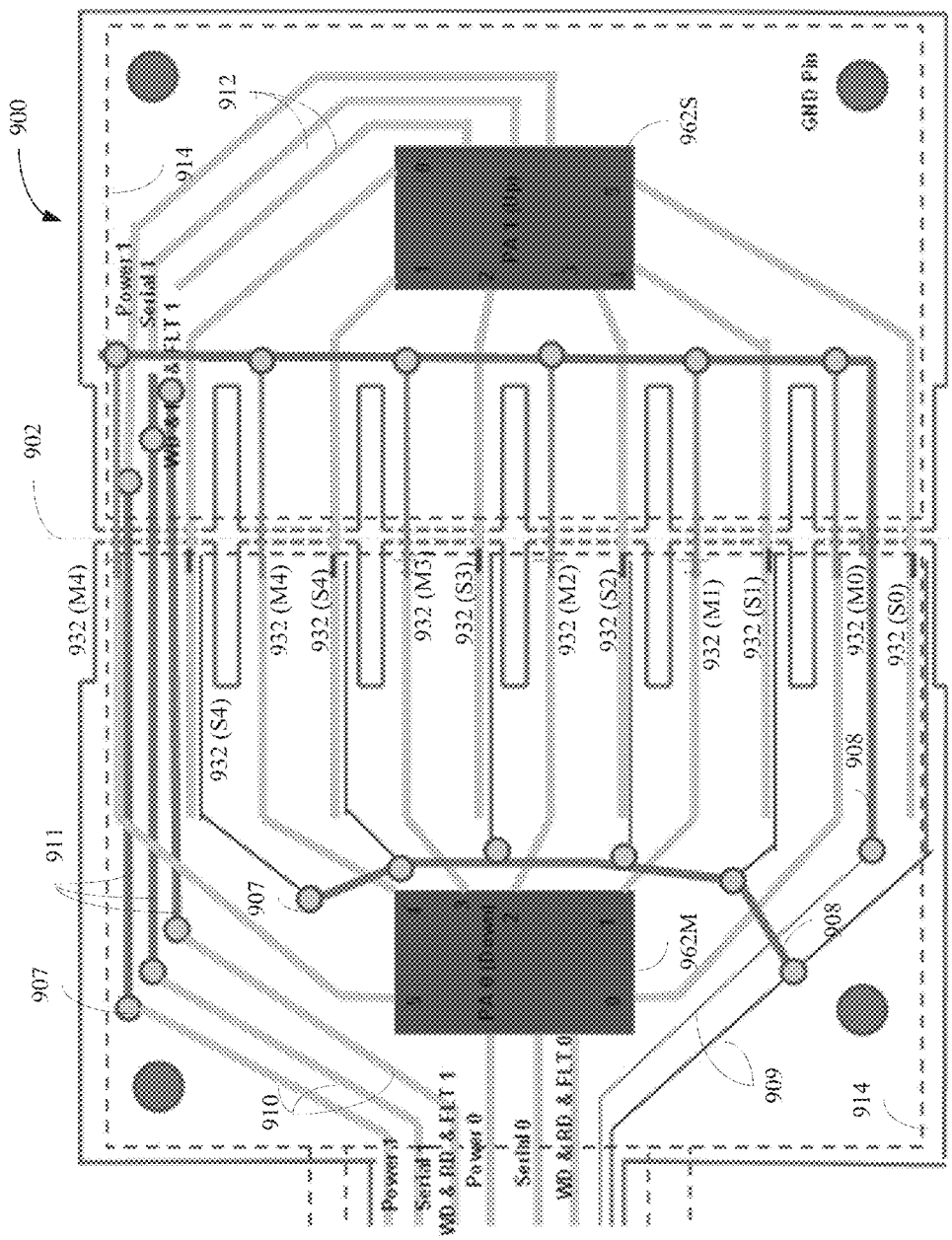

FIG. 9 illustrates an example embodiment of a folded flex circuit 900 with dual conducting layers. The flex circuit 900 includes the master preamplifier 962M configured to be coupled to master heads 932 (M0-M5) (actual heads not shown) and the slave preamplifier 962S configured to be coupled to slave heads 932 (S0-S5) (actual heads not shown). A centrally positioned fold 902 enables the slave preamplifier 962S to be folded behind the master preamplifier 962M. This configuration provides for traces 910 on a top conducting layer to be connected with traces 912, also on the top conducting layer, by utilizing vias 907 to connect there between with traces 911 in a bottom conducting layer. Traces 909, which may, for example, be used for micro actuators, are also illustrated as taking advantage of traces 909 on the top conducting layer connected through vias 907 to traces 908 on the bottom conducting layer. Once again, a stiffener 914, for example, aluminum, may be provided to either side of the fold 902 enabling amplifier heat sink, and easier fold and assembly processes.

Figure 10:
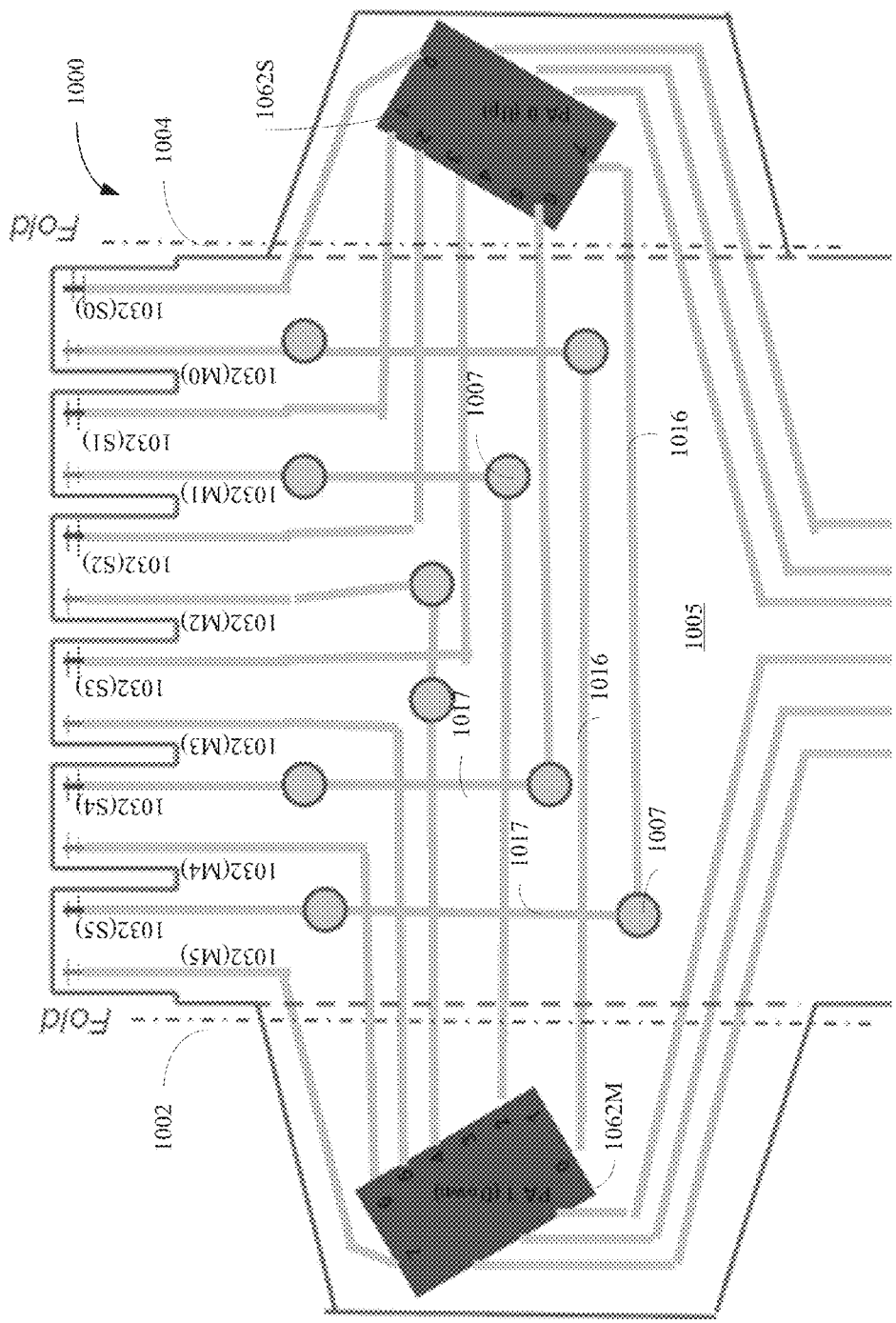

FIG. 10 illustrates another example embodiment of a flex circuit 1000 with dual conducting layers. The flex circuit 1000 includes the master preamplifier 1062M configured to be coupled to master heads 1032 (M0-M5) (actual heads not shown) and the slave preamplifier 1062S configured to be coupled to slave heads 1032 (S0-S5) (actual heads not shown). A pair of side-positioned folds 1002 and 1004 enables each of the preamplifiers 1062M and 1062S to be folded behind a central portion 1005. Upper-conducting layer traces 1016 from the preamplifiers 1062M, 1062S may be connected to their respective end points proximate heads 1032 (M0-M5), 1032 (S0-S5) through the use of lower-conducting layer traces 1017 with vias 1007 connecting the conducting layers. As with all embodiments, stiffeners may be used in the flex circuit 1000 as desired.

Figure 11:
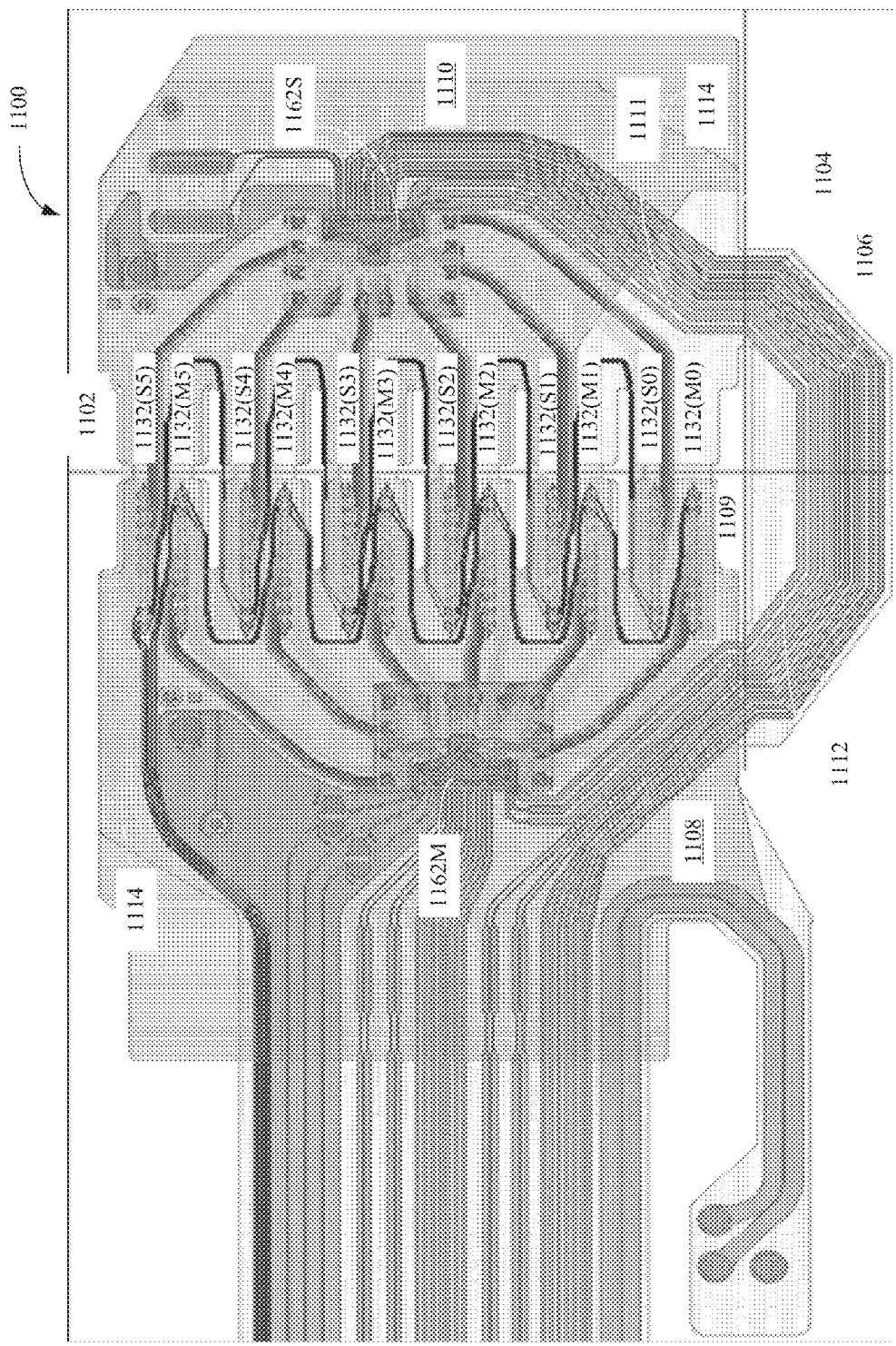

FIG. 11 illustrates an example of a folded flex circuit 1100 utilizing a single conducting layer with two folds. The flex circuit 1100 includes the master preamplifier 1162M configured to be coupled to master heads 1132 (M0-M5) (actual heads not shown) and the slave preamplifier 1162S configured to be coupled to slave heads 1132 (S0-S5) (actual heads not shown). A centrally positioned fold 1102 enables the slave preamplifier 1162S to be folded behind the master preamplifier 1162M. A lower, second fold 1104 enables an elongated tab 1106 to be folded in between the front (master) and back (slave) folded flex surfaces, 1108 and 1110, respectively. The elongated tab 1106 enables the traces 1112 to be continuously maintained in a single conducting layer from the front folded flex surface 1108 to the back folded flex surface. A stiffener 1114 may be provided in the flex circuit 1100 and optionally, a cut-out 1111 may be incorporated the stiffener to form a pocket for tucking the folded elongated tab 1106 into. In this configuration, the preamplifier 1162M, 1162S have been offset from each other to provide easier routing of traces. Further, the present configuration has taken advantage of utilizing currently available 12-channel preamplifiers for preamplifiers 1162M, 1162S; the configuration uses only every other channel to provide additional room for routing traces, and to ensure that the currently available preamp padout is compatible with this embodiment. The present configuration has used alternating, standard order, and then reverse order, end bond pad 1109 layouts for improved trace routing. FIG. 11 also illustrates how master and slave heads micro-actuator traces may be routed independently in a single conductor layer circuit.

Figure 12:
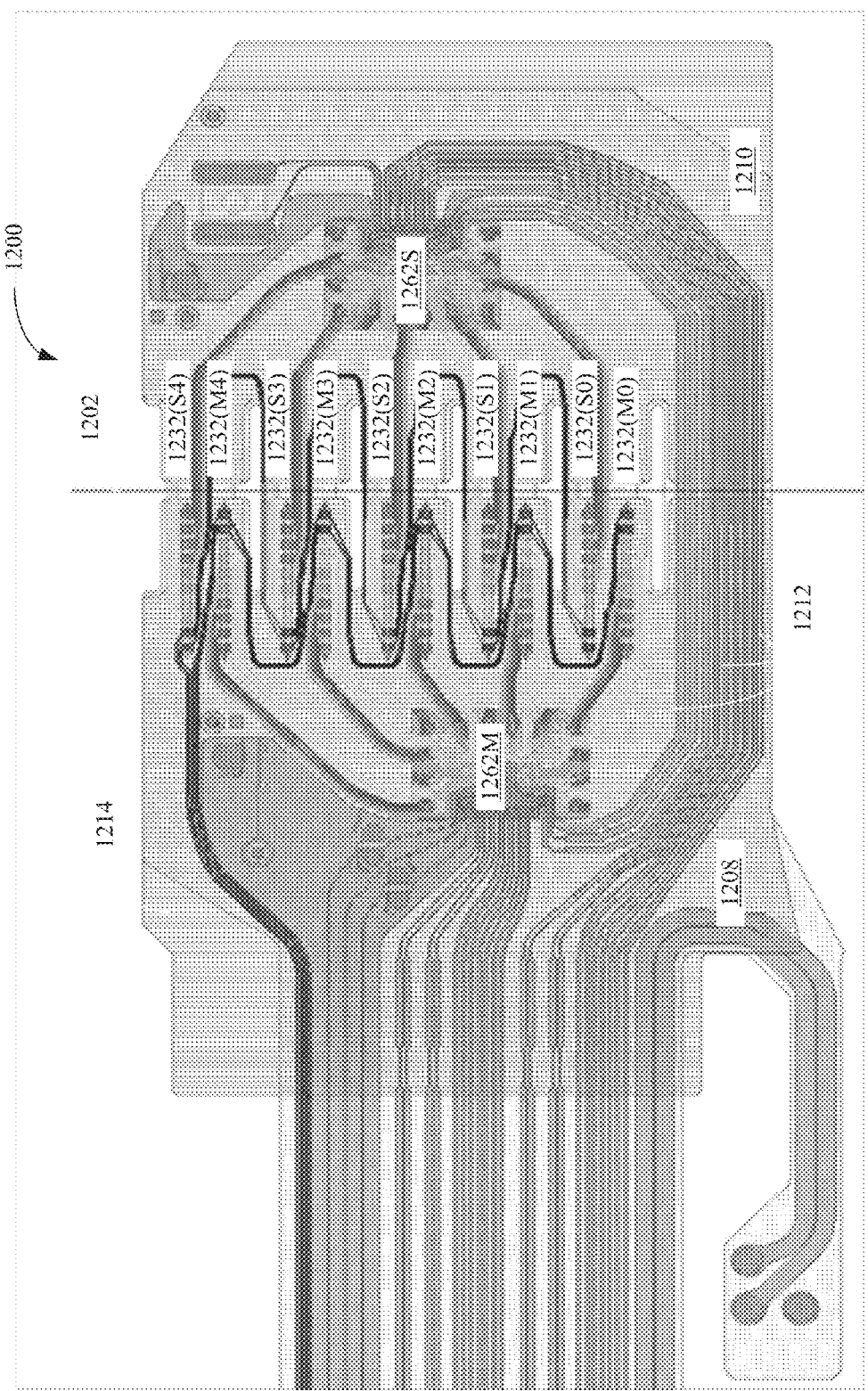

FIG. 12 illustrates an example of a folded flex circuit 1200 utilizing a single conducting layer and a single fold. The flex circuit 1200 includes the master preamplifier 1262M configured to be coupled to master heads 1232 (M0-M4) (actual heads not shown) and the slave preamplifier 1262S configured to be coupled to slave heads 1232 (S0-S4) (actual heads not shown). A centrally positioned fold 1202 enables the slave preamplifier 1262S to be folded behind the master preamplifier 1262M. In this configuration, only five of the six available channels on each of the preamplifiers 1262M, 1262S have been used. Using only five of the six channels provides room for routing traces 1212 between the front (master) 1208 and back (slave) 1210 folded flex surfaces without having to fold a tab for the back-end signals and power to the slave preamp. As before, a stiffener 1214 may be provided.

Various modifications and additions can be made to the disclosed embodiments discussed above including but not limited to the number of preamplifiers, the number of channels supported and/or used by the preamplifiers, the number of folds used in a flex circuit, the number of conducting layers used, the number of vias used, folding the master preamplifier behind the slave preamplifier rather than slave behind master, etc. Accordingly, the scope of the present disclosure should not be limited by the particular embodiments described above, but should be defined only by the claims set forth below and equivalents thereof.

The invention claimed is:

1. A system comprising:
   a head stack assembly comprising two or more head gimbal assemblies;
   a single flex circuit secured at the head stack assembly, the single flex circuit comprising:
      a first preamplifier configured to be connected to a first recording head;
      a second preamplifier configured to be connected to a second recording head, wherein the first recording head and the second recording head are configured to concurrently perform read operations on a first surface of a disk and a second surface of the disk, the second surface being opposite the first surface; and
      traces that extend from a side of the circuit facing the two or more head gimbal assemblies, the traces coupling the first and second preamplifiers to the respective first and second recording head.

2. The system of claim 1, wherein the single flex circuit comprises a single conductor layer flex circuit.

3. The system of claim 1, wherein the single flex circuit comprises a dual conductor layer flex circuit.

4. The system of claim 1, wherein the single flex circuit comprises a fold.

5. The system of claim 4, wherein the fold positions the second preamplifier substantially behind the first preamplifier.

6. The system of claim 1, wherein the single flex circuit comprises a plurality of folds.

7. The system of claim 6, wherein the plurality of folds comprise at least one fold enabling a tab of the single flex circuit to be folded towards, or away from, one or both of the first and second preamplifiers.

8. The system of claim 1, wherein the single flex circuit comprises at least one stiffener.

9. The system of claim 8, wherein the stiffener includes a cut-out.

10. An apparatus comprising:
    a head stack assembly comprising two or more head gimbal assemblies;
       a single flex circuit secured at the head stack assembly, the flex circuit comprising:
       a first preamplifier configured to be connected to a first recording head via first traces along a first edge of the flex circuit;
       a second preamplifier configured to be connected to a second recording head via second traces along a second edge of the flex circuit that is opposite the first edge, wherein the single flex circuit is configured to have an unfolded configuration placing the first and second preamplifiers in a first position relative to one another and a folded configuration placing the first and second preamplifier in a second position relative to one another, the first and second traces facing towards the two or more head gimbal assemblies in the folded configuration wherein the first recording head and the second recording head are configured to concurrently perform read operations on a first surface of a disk and a second surface of the disk, the second surface being opposite the first surface.

11. The apparatus of claim 10, wherein the folded configuration comprises a first fold that places the first preamplifier behind the second preamplifier.

12. The apparatus of claim 11, the single flex circuit further comprising a central body portion and a tab extending beyond the central body portion.

13. The apparatus of claim 12, wherein the folded configuration further comprises a second fold that places the tab behind the central body portion.

14. The apparatus of claim 13, wherein the central body portion includes a pocket for placement of the tab in the folded configuration.

15. The apparatus of claim 12, wherein the tab comprises a first tab containing the first preamplifier and a second tab containing the second preamplifier and wherein the folded configuration comprises a first fold that places the first preamplifier behind the central body portion and a second fold that placed the second preamplifier behind the central body portion.

16. The apparatus of claim 10, wherein the single flex circuit further comprises a stiffener.

17. An apparatus comprising:
    a head stack assembly comprising two or more head gimbal assemblies;
    a single flex circuit secured at the head stack assembly, the flex circuit comprising:
       a first preamplifier connected to a first recording head;
       a second preamplifier connected to a second recording head;
       a plurality of bond pad sets per each of the preamplifiers, wherein each of the preamplifiers is configured to be electrically coupled to their respective bond pad sets and wherein each of the plurality of bond pad sets is configured to interface with a respective recording head, wherein at least the first recording head and at least the second recording head are configured to concurrently perform read operations on a first surface of a disk and a second surface of the disk, the second surface being opposite the first surface; and
       traces that extend from a side of the circuit that facing the two or more head gimbal assemblies, the traces coupling the first and second preamplifiers to the respective first and second recording head.

18. The apparatus of claim 17, wherein the preamplifiers includes at least a master preamplifier and a slave preamplifier.

19. The apparatus of claim 17, wherein the single flex circuit comprises a dual conductive layer flex circuit.

20. The apparatus of claim 17, wherein the single flex circuit further comprises a stiffener.

* * * * *